United States Patent
Kain et al.

(10) Patent No.: US 11,472,424 B2
(45) Date of Patent: Oct. 18, 2022

(54) METHOD FOR DYNAMIC CONTEXT-BASED DISTRIBUTION OF SOFTWARE IN A VEHICLE CONTROL SYSTEM, AND A CONTROL SYSTEM

(71) Applicant: Volkswagen Aktiengesellschaft, Wolfsburg (DE)

(72) Inventors: Tobias Kain, Oberndorf/Melk (AT); Maximilian Wesche, Edemissen (DE); Hendrik Decke, Braunschweig (DE); Julian-Steffen Müller, Hanover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 18 days.

(21) Appl. No.: 17/121,575

(22) Filed: Dec. 14, 2020

(65) Prior Publication Data
US 2021/0188294 A1    Jun. 24, 2021

(30) Foreign Application Priority Data
Dec. 19, 2019   (DE) .......................... 102019220160.1

(51) Int. Cl.
*B60W 50/032*  (2012.01)
*B60W 50/023*  (2012.01)
*B60W 50/038*  (2012.01)
*G05D 1/00*    (2006.01)
*B60W 50/00*   (2006.01)

(52) U.S. Cl.
CPC ........ *B60W 50/032* (2013.01); *B60W 50/023* (2013.01); *B60W 50/038* (2013.01); *B60W 2050/0083* (2013.01); *G05D 1/0088* (2013.01)

(58) Field of Classification Search
CPC ............. B60W 50/032; B60W 50/023; B60W 50/038; B60W 2050/0083; B60W 2050/0006; B60W 60/00; G05D 1/0088; G06F 8/61
See application file for complete search history.

(56) References Cited

U.S. PATENT DOCUMENTS

| | | | |
|---|---|---|---|
| 2016/0142253 A1 | 5/2016 | Steinder et al. | |
| 2018/0370540 A1* | 12/2018 | Yousuf | B60W 10/20 |
| 2021/0125036 A1* | 4/2021 | Tremblay | G06N 3/08 |
| 2022/0080992 A1* | 3/2022 | Yousuf | B60W 50/045 |

* cited by examiner

*Primary Examiner* — Marthe Y Marc-Coleman
(74) *Attorney, Agent, or Firm* — Loza & Loza, LLP; Peter Zura

(57) ABSTRACT

Technologies and techniques for dynamic, context-based distribution of program codes in a control system in a vehicle. The control system includes numerous control units. The allocation of the program codes to the corresponding control units in the control system takes place using a global placement chart. The global placement chart is calculated on a computer, which may be located outside the control system. The data from the global placement chart are sent to the control system. Other aspects include an at least partially autonomous motor vehicle that has a control system for executing dynamic, context-based distribution of program codes.

20 Claims, 5 Drawing Sheets

→ events
● current configuration
⊗ precomputed reconfiguration (design time)
⊘ precomputed reconfiguration (runtime)
○ not determined reconfiguration

METHOD FOR DYNAMIC CONTEXT-BASED DISTRIBUTION OF SOFTWARE IN A VEHICLE CONTROL SYSTEM, AND A CONTROL SYSTEM

RELATED APPLICATIONS

The present application claims priority to German Patent Application No. DE 102019220160.1 to Kain et al., filed Dec. 19, 2019, the contents of which is incorporated by reference in its entirety herein.

BACKGROUND

The present disclosure relates to technologies and techniques for dynamic, context-based distribution of software in a vehicle control system, a control system for executing such a method, a motor vehicle with such a control system, and a computer program.

Today's vehicles already have numerous computer-based assistance systems that assist the driver in numerous driving situations. These assistance systems use sensors to obtain measurement data that are much more sensitive than humans. These assistance systems also react significantly faster than humans. Known driver assistance systems include, for example, lane keeping assistance, braking assistance upon detecting pedestrians, and adaptive cruise control, in particular for heavy traffic.

By using these assistance systems, the autonomy of the driver with regard to driving decisions is increasingly transferred to the vehicle, or the control units therein. The result of these developments is a self-driving vehicle that can maneuver without any intervention from a person. Such a self-driving vehicle enables fully automated passenger transportation.

A driving system controls the operation of a self-driving automobile, which is understood in general herein to be a control unit designed and configured specifically for this. This control unit is configured to automatically control the vehicle laterally and longitudinally using numerous input signals, in particular sensor data collected by the vehicle itself, as well as communication data that has been received. Such an automatic lateral and longitudinal control of the vehicle requires complex calculations on the part of the driving system, which normally has algorithms, models and control functions for this, based at least in part on machine learning (artificial intelligence).

Numerous interacting software applications are needed to safely operate an autonomous automobile. The problem, however, is that errors, such as a software error or a computing node error, may mean that some applications can no longer be executed. Depending on the importance of the application, this can have dramatic consequences regarding the safety of the passengers and other road users.

In order to avoid tragic consequences due to errors, the software applications can be executed redundantly at various computing nodes. The idea is that the redundancies can be carried out in a passive mode. This means that they carry out the same procedures as the active entities, but without interacting with the systems that are executing them.

Depending on the relevancy of the function in question, this could result in uncontrolled driving states, and may cause discomfort or even endanger the passengers of the autonomously driven motor vehicle. Safety-relevant system redundancy is used to avoid hazardous driving situations.

The assignment of assistance applications to computing nodes is not trivial. The decisions depend on numerous different parameters. By way of example, computing nodes only have limited computing and memory resources. At the same time, each application requires a certain amount of resources in order to function as intended. To ensure that all of the applications can be executed on the computing nodes installed in the vehicle, a multi-dimensional complex application placement problem must be solved.

Hazardous situations caused by software or hardware errors can be avoided (in part), as explained above, through redundant software design. The introduction of redundant assistance applications, however, increases the complexity of the application placement problem, because additional parameters must be taken into account. By way of example, the minimum number of redundant entities can be defined for each application. The minimum degree of hardware segregation can also be defined for each application. These parameters indicate the minimum number of different computing nodes on which the entities of the application must be executed. The number of available control units and the requirements for a minimum hardware segregation with respect to the programs result in a distribution problem.

Because the number of software applications necessary for operating an autonomous vehicle is fairly large (approximately a few hundred applications are involved), there are numerous valid assignments between computing nodes and assistance applications. Not all of these valid assignments are "good," however. In order to select the best possible mapping, an optimization goal must be formulated. The optimization goal can be formulated such that mappings using all the computing nodes that the vehicle is equipped with are preferred. In addition to this optimization goal, numerous other target functions can be imagined that take other criteria into account.

When a malfunctioning sensor, control unit, or a program code error results in a malfunction of the control system, a reconfiguration of the software on the different control units in the control system may be necessary to be able to safely execute the functions of the control system again.

A cloud-computer system and a method for operating such a system are known from US 2016/0 142 253 A1. The cloud-computer system can exchange data with an external computing unit, e.g. a workplace computer, a smartphone, a laptop, or a control unit in a motor vehicle.

Such solutions are known for navigation systems in motor vehicles, which enable a real-time navigation through numerous external data collection modules and an evaluation of these data by a cloud-computer system, taking the current traffic density and current traffic disruptions into account.

SUMMARY

An aspect of the present disclosure is therefore to improve the reconfiguration process during a necessary reconfiguration of the software on a control system for an autonomous operation of a motor vehicle, and to therefore minimize the computing power and power consumption in the motor vehicle.

In some examples, a method is disclosed for dynamic, context-based distribution of program codes in a vehicle control system, wherein the control system contains numerous control units for executing the program code. The allocation of the program codes to the corresponding control units in the control system takes place using a global placement chart, wherein the global placement chart is calculated on a computer outside the control system, and the data in the global placement chart is sent to the control system. As a result, when a control unit malfunctions, or in the case of an error when the control system executes a program code, a solution for dynamic distribution of the active program code to the remaining control units is provided, such that a complex and difficult solution to an optimization problem does not need to be executed by the control system in the motor vehicle, but instead, is provided by an external computing center. As a result, the amount of computing power used in the motor vehicle can be reduced, thus increasing the energy efficiency of the motor vehicle. In addition, with similar problems in similar motor vehicles, a solution can be provided before the problem actually occurs in the motor vehicle in question, such that a quick reconfiguration of the control system can take place, thus increasing the safety of the motor vehicle.

Advantageous improvements and non-trivial developments of the method for dynamic, context-based distribution of software in a vehicle control system can be derived from the features listed in other aspects disclosed herein.

In some examples, if a control unit malfunctions, or there is an error in executing a program code, it is checked whether the control system already has an allocation plan for allocating the remaining active program code to the available control units. As a result, complex and difficult recalculations for an optimal distribution of active program code to the control units are unnecessary. Consequently, the computing power in the control system can be used entirely for the autonomous driving mode, resulting in a higher target achievement level and thus a greater safety buffer.

In some examples, if a control unit malfunctions, or there is an error in executing a program code, it is checked whether the control system already has an allocation plan for allocating the remaining active program code to the available control units. If there is an emergency plan, a quick implementation of the reconfiguration of the control system can be obtained from the central placement chart. If an emergency plan is not provided by the global placement chart, a solution can be calculated locally, which can be subsequently uploaded to the computing center and distributed to similar motor vehicles. As a result, the central placement chart can be further optimized on the basis of malfunction events.

In some examples, if there is an allocation plan, the program codes are allocated to the control units accordingly. In this manner, it can be ensured that if a control unit malfunctions, or there is an error in executing a program code, the highest possible target achievement level is reached for the autonomous driving mode.

Alternatively, if there is no allocation plan, it is advantageously checked whether a minimum number of redundantly executed program codes necessary for an autonomous driving mode are available. It can thus be calculated whether there is a risk of dangerous situations as a result of the malfunctioning of the control unit or an error in executing a program code, and measures can be quickly introduced for minimizing the consequences of the error or the malfunction.

In another example, the motor vehicle is brought to a standstill and/or is driven to the next safe stopping point by a fail-safe system, if the minimum number of redundantly executed program codes is not reached. Braking the motor vehicle to a standstill normally defuses the situation. In certain situations, such as in an unlit tunnel, on the highway, in particular a highway construction site, stopping the motor vehicle can lead to a dangerous traffic situation. In this case, it is preferred that the fail-safe system at least drive the motor vehicle to a safe stopping point for the motor vehicle, if it is still possible to operate the vehicle autonomously, thus avoiding hazardous traffic situations.

The control system may be advantageously operated in an emergency mode and an allocation plan is created if a sufficient number of necessary redundant program codes are carried out for an autonomous driving mode. The speed can be reduced, in particular, and other vehicle functions, in particular comfort functions, can be limited, in order to prioritize and ensure that safety-relevant functions remain active.

In some examples, the control system may be checked to determine which control units are unused or only utilized to a slight extent, and an allocation plan is created on the basis of which control units are available.

Program code for an autonomous driving mode may be categorized in at least two orders of priority, wherein program codes of a lower order are stopped in order to provide additional computing power for executing higher order program code. Because of the multiple redundancies of the functions of the higher and highest orders, a malfunctioning of a control unit will not result in hazardous operating states, but instead will only be noticed by the passengers in the motor vehicle as a reduction in the driving comfort.

In some examples, an optimization routine may be carried out, which optimizes the program codes that are to be executed on the remaining control units, wherein the results of the optimization are sent to the computer. As a result, a self-learning network can be obtained in the computing center, thus enabling an optimization of the global placement chart on the basis of the data collected in the motor vehicles.

In some examples, the global placement chart may be obtained on the basis of different control systems in similar motor vehicles. Because similar errors and malfunction mechanisms can be expected in similar motor vehicles with identical or similar hardware and software configurations, it may be advantageous to calculate a global placement chart for a specific vehicle model or a corresponding series of models, in order to provide similar vehicles with an optimized emergency solution, prior to an error occurring in the execution of a program code, or prior to the malfunctioning of a control unit.

In some examples, the global placement chart may be sent to a motor vehicle when the motor vehicle is at a charging station. The control system in the motor vehicle is largely inactive during the charging procedure. In addition, unlimited energy is available, enabling data transfer without impacting the range of the motor vehicle. It is therefore advantageous to send the global placement chart to the control system in the motor vehicle during a charging procedure. Furthermore, the motor vehicle can send a locally calculated chart to the computing center after a control unit malfunctions, or if there is an error in executing program code, in order to share the solution, and make it available for other motor vehicles.

Another aspect of the present disclosure relates to a control system comprising numerous control units, in which the control system is configured to execute such a method to operate at least partially autonomous motor vehicles when numerous machine-readable program codes are executed by at least two control units in the control system.

A vehicle executing methods according to the present disclosure may also include a driving system configured for an automatic driving operation of the vehicle. The driving system is configured in particular for fully automatic longitudinal and/or lateral control of the vehicle. The driving system preferably accesses a large amount of sensor data acquired by the vehicle, as well as communication data received by the vehicle. The driving system is configured in particular to execute driver assistance functions ranging from partially to fully automated driving. The driving system contains control algorithms for this, which are at least partially based on machine learning, and contain, e.g. target functions and/or neural networks. Function data are therefore also necessary for operating the driving system, which contain, e.g. parameters for a neural network, or optimized function parameters. This function data is stored in the driving system for the vehicle as a function data set. At the start of the method according to the present disclosure, a (relatively) first function data set is always stored in the driving system for the vehicle.

A vehicle that executes the method according to the present disclosure also contains a control unit. This control unit is preferably configured to communicate with the other components in the vehicle, in particular with the first communication module and with the driving system, as well as with any sensors, and to coordinate their functions. The control unit also preferably contains a memory, or controls such.

In some examples, the scope of functions in the driving system increases as the licensing level of the vehicle increases. In other words, the degree of automation operating the vehicle increases as the licensing level of the vehicle increases. The licensing levels of the vehicle correlate to the various levels of autonomous driving. A vehicle therefore has a licensing level 0 in its delivery state. The licensing level 0 also corresponds to an automation degree level 0 ("driver only"), according to which the driver assumes permanent longitudinal and lateral control of the vehicle, and the driving system does not actively intervene in the operation of the vehicle.

In some examples, licensing level 1 corresponds to an automation degree level 1 ("assisted"), according to which the driver assumes permanent longitudinal and lateral control of the vehicle, and the driving system assumes control of the other functions. Licensing level 2 corresponds to an automation degree level 2 ("partially automated"), according to which a driver must permanently monitor the vehicle, and the driving system assumes longitudinal and lateral control of the vehicle in certain applications.

Licensing level 3 corresponds to automation degree level 3 ("highly automated"), according to which a driver does not have to permanently monitor the vehicle, but must be able to assume control of the vehicle. According to automation degree level 3, the driving system also assumes longitudinal and lateral control in specific applications, identifies limits of the driving system itself, and requires the driver to assume control with sufficient time to do so. Licensing level 4 corresponds to an automation degree level 4 ("fully automated"), according to which a driver is not needed in a specific application, and the driving system manages the situation fully autonomously in the specific application.

Licensing level 5 corresponds to an automation degree level 5 ("driverless"), according to which no driver is needed from start to finish, and the driving system fully assumes the role of the driver in all applications. The above definitions correspond to the "five levels of autonomous driving," as defined by the Verband der Deutschen Automobilindustrie, VDA [EN: Association of the German Automobile Industry]. Applications refer to road types, speed ranges, and environmental or weather conditions.

Another aspect of the present disclosure relates to a vehicle, in particular a passenger automobile with an internal combustion engine, electric motor, or hybrid engine. The vehicle contains sensors at least for collecting environment data, via which the control units in the control system are supplied with data for autonomous driving.

Another aspect of the present disclosure relates to a computer program, comprising program code for executing the steps of methods disclosed herein for operating an at least partially autonomous motor vehicle, when the program code in the computer program is executed on a computer.

The steps of methods according to the present disclosure can be implemented by electrical or electronic components or elements (hardware), firmware (ASIC), or they can be realized by executing a suitable program (software). The methods according to the present disclosure may likewise be realized or implemented by a combination of hardware, firmware, and/or software. By way of example, individual components for executing individual steps of the method are configured as separate integrated circuits, or arranged on a shared integrated circuit. Individual components configured to execute individual steps of the method are also preferably arranged on a (flexible) printed circuit board (FPCB/PCB), a tape carrier package (TCP) or some other substrate.

The individual steps of methods according to the present disclosure may also preferably form one or more processes that run on one or more processors in one or more electronic computers, and are generated when one or more computer programs are executed. The computers are preferably configured to cooperate with other components, e.g. a communication module, as well as one or more sensors or cameras, in order to realize the functionalities described herein. The instructions of the computer programs are preferably stored in a memory, e.g. an RAM element. The computer programs can also be stored on a non-volatile storage medium, e.g. a CD-ROM, flash memory, etc.

It is also clear to the person skilled in the art that the functionalities of numerous computers (data processors) can be combined, or combined to form a single device, or that the functionalities of one data processor can be distributed among numerous devices, in order to execute the steps of the method according to the present disclosure without deviating from the method according to the present disclosure.

The various embodiments of the present disclosure specified in this application can be combined with one another, if not otherwise specified.

BRIEF DESCRIPTION OF THE DRAWINGS

The invention shall be explained below in reference to exemplary embodiments, based on the associated drawings. Therein.

DETAILED DESCRIPTION

Figure 1:
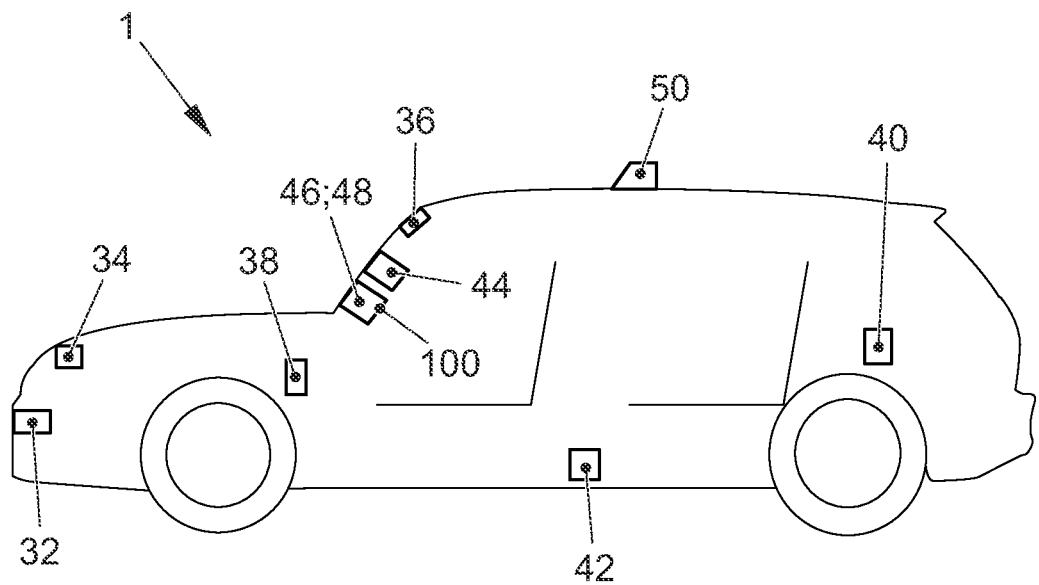
FIG. 1 shows a schematic illustration of a system that includes a motor vehicle that includes sensors and a control unit for executing an at least partially autonomous operation of the motor vehicle under some aspects of the present disclosure.

FIG. 1 shows a schematic illustration of a block diagram for an exemplary motor vehicle 1, in particular an automobile that has an internal combustion engine, an electric motor, or a hybrid engine. The motor vehicle 1 includes numerous first sensors, in particular a first sensor 32, a second sensor 34, and a third sensor 36. The first sensors 32, 34, 36 are configured to collect environment data for the motor vehicle 1, and include, e.g. a camera for recording an image of the immediate environment of the vehicle 1, distance sensors, e.g. ultrasonic sensors or LIDAR for detecting distances from the vehicle 1 to surrounding objects. The first sensors 32, 34, 36 send the environment signals they acquire to control units 12, 14, 16, 18 in a control system 10 for the motor vehicle 1.

The motor vehicle 1 may also have numerous second sensors, in particular a fourth sensor 38, a fifth sensor 40, and a sixth sensor 42. The second sensors 38, 40, 42 are sensors for determining relevant status data for the motor vehicle itself 1, e.g. current position and movement information relating to the vehicle 1. The second sensors may therefore include, e.g. speed sensors, acceleration sensors, tilt sensors, sensors for measuring the emersion depth of a bumper, wheel rotation sensors, etc. The second sensors 38, 40, 42 send their status signals to the control units in the motor vehicle 1. In particular, the second sensors 38, 40, 42 send their measurement results to a control unit 12, 14, 16, 18 in the control system 10 for the motor vehicle 1.

The motor vehicle 1 may also contain the control system 10, which is configured for fully automated driving, in particular autonomous longitudinal and lateral control, of the motor vehicle 1. The control system 10 contains a navigator 44, which is configured to calculate routes between a starting point and a destination, and to determine the maneuvers that are to be executed along this route by the motor vehicle 1. The navigator 44 is also preferably configured to execute specific maneuvers of the motor vehicle 1, e.g. entering and exiting parking spaces. The control system 10 also includes an internal memory 46 that communicates with the navigator 44, e.g. via an appropriate data bus. A model, a neural network, and/or a target function are stored, in particular, on the internal memory 46, which are at least partially based on machine learning. Function data for the model, neural network, or target function are also stored as a function data set in the internal memory 46. The functionality of the control system 10 is preferably controlled by a control unit, and is activated in particular on the basis of the licensing level of the motor vehicle 1.

The control system 10 is configured to execute the steps of the method according to the present disclosure in the motor vehicle 1. The control system 10 executes the method my means of the control units 12, 14, 15, 18, or activates the other components in the motor vehicle 1 accordingly. Each of the control units 12, 14, 15, 18 has an internal memory 46 and a CPU 48, which communicate with one another, e.g. via an appropriate data bus. The control units 12, 14, 16, 18 in the control system 10 are also in communication with at least the first sensors 32, 34, 36 and the second sensors 38, 40, 42, as well as any other control units in the motor vehicle, e.g. for controlling the heater or climate control in the motor vehicle, a radio, navigation system, or other information or entertainment systems. The communication takes place via one or more respective CAN connections, one or more respective SPI connections, or other appropriate data connections, for example. There is a communication interface on the motor vehicle 1 for exchanging data with an external computing center 64.

Figure 2:
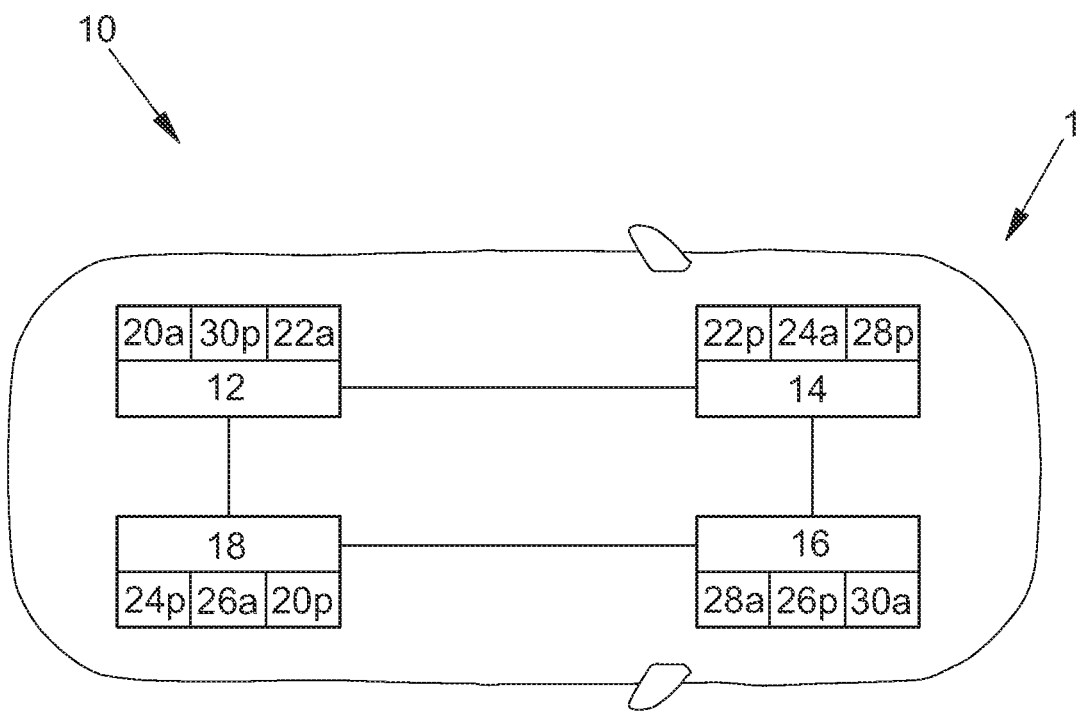
FIG. 2 shows a control system that includes numerous control units, which execute numerous program codes for controlling an at least partially autonomous operation of the motor vehicle under some aspects of the present disclosure.

FIG. 2 shows a schematic configuration of a control system 10 for controlling an at least partially autonomous, preferably fully autonomous, motor vehicle 1. The control system 10 includes four control units 12, 14, 15, 18, each of which executes at least one program code 20, 22, 24, 25, 28, 30 for executing a partially autonomous or fully autonomous operation of the motor vehicle 1. Each program code 20, 22, 24, 26, 28, 30 is redundantly applied to two different control units 12, 14, 16, 18. A program code 20a, 22a, 24a, 26a, 28a, 30a is actively executed by a control unit 12, 14, 16, 18 and evaluated for controlling the motor vehicle 1, while the respective redundant program codes 20p, 22p, 24p, 26p, 28p, 30p remain passive, and are first integrated in the control of the motor vehicle 1 when a previously active program 20a, 22a, 24a, 26a, 30a can no longer be evaluated for controlling the motor vehicle 1 due to an error or the malfunction of the respective control unit 12, 14, 16, 18.

Figure 3:
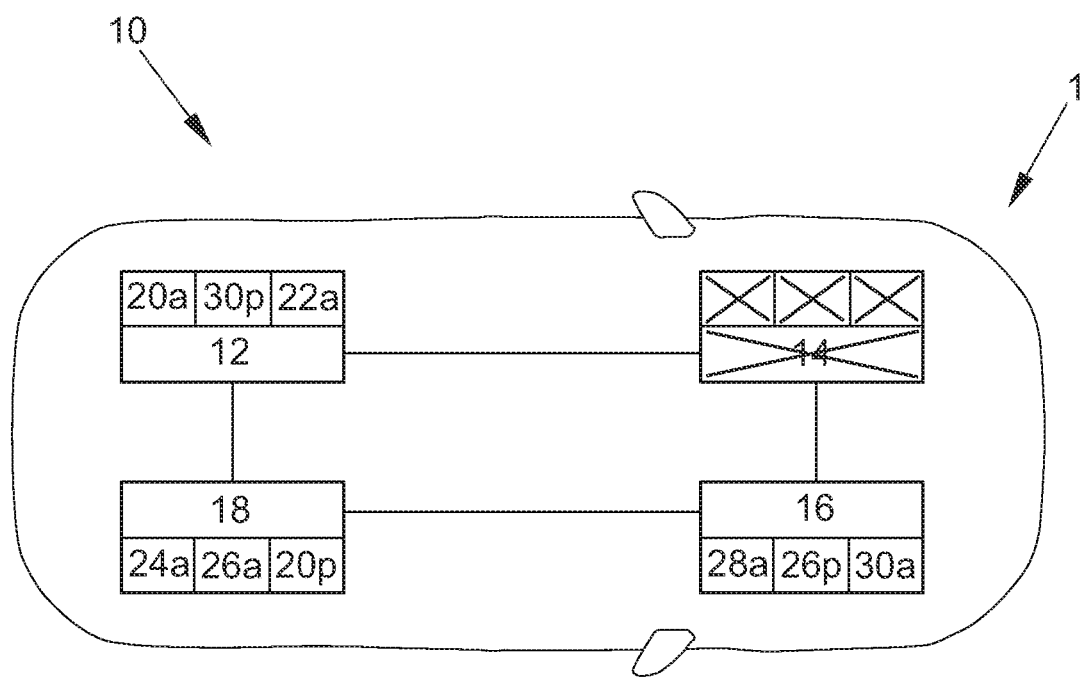
FIG. 3 shows a control system that includes numerous control units, wherein, if a control unit malfunctions, or a program code crashes, the missing function is assumed by a redundant program code on another control unit under some aspects of the present disclosure.

The placement of the program codes 20, 22, 24, 26, 28, 30 can change frequently during operation of a motor vehicle 1. By way of example, after an event such as the malfunction of a control unit 12, 14, 16, 18, or the malfunction of an application, it may be necessary to change to a new application placement. Aside from these events, the identification of an optimization opportunity can also trigger a switch to a new control unit 12, 14, 16, 18. Such a case, in which the second control unit 14 malfunctions, is shown in FIG. 3. The third program code 24a is initially executed by the second control unit 14. After this second control unit 14 malfunctions, or after a crash of the third program code 24a actively executed so far on the second control unit 14, the third program code 24p on the third control unit 16 is activated and evaluated for the ongoing control of the motor vehicle 1. As a result, dramatic driving situations caused by a lack of control of the motor vehicle 1 can be avoided.

To enable an optimization of the active program codes 20a, 22a, 24a, 26a, 28a, 30a, it is necessary to know the current driving situation and the current performance of the control system 10. Reference is made with regard to the system, to the performance of all of the software applications 20, 22, 24, 26, 28, 30, all control units 12, 14, 16, 18, and other hardware, in particular the sensors 52, 54, 56, 58, 60, 62.

The following examples illustrate this dependency.

In some examples, assuming that the motor vehicle 1 is an electric automobile driving a passenger to an important meeting, and the battery for the motor vehicle 1 is nearly empty. In such a situation, the goal of arriving punctually at the intended destination is more important than entertaining the passenger. To increase the range of the motor vehicle 1, all applications relating to entertainment can be stopped. Consequently, some control units 12, 14, 16, 18 can be shut down, thus saving energy.

In some examples a motor vehicle 1 is assumed to be stuck in traffic. Because the motor vehicle 1 is hardly moving, redundant entities of driving functions can be stopped. This frees up resources with which an application can be executed that contributes to an improvement in the traffic flow, for example.

Because of the system crash, half of the control units 12, 14, 16, 18 installed in the motor vehicle no longer function. Because the remaining control units 12, 14, 16, 18 do not provide enough resources to execute all of the program codes 20, 22, 24, 26, 28, 30 of the applications that were executed before the crash, a new application placement plan must be calculated. The goal of the placement optimization is to map all of the applications that are necessary for bringing the motor vehicle 1 safely to a stop, in order to ensure the safety of the passengers and other road users.

Figure 4:
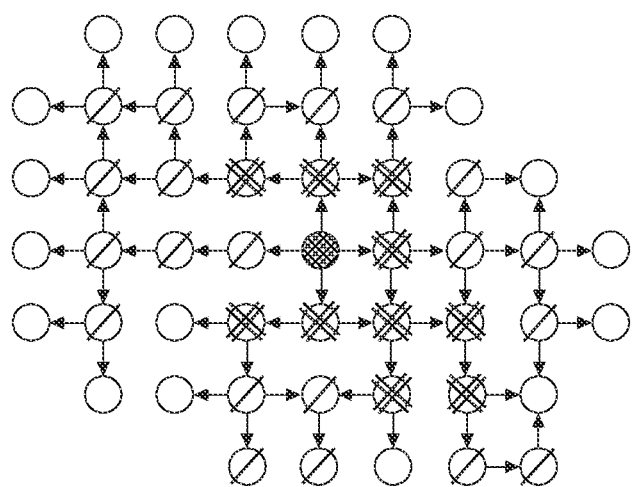
FIG. 4 shows a global placement chart for determining a best possible allocation of the executed program code to the available control units under some aspects of the present disclosure.

A global placement chart 62 is shown in FIG. 4, which could also be referred to as an allocation chart 62. In the present disclosure, a dynamic, context-based optimization takes place through abstraction of the local computing problem for the allocation of the program codes 20, 22, 24, 26, 28, 30 to the respective control units 12, 14, 16, 18 in the control system 10 in the motor vehicles 1, 80, 82, 84 to obtain a global computing problem. This computing problem is solved by a computing center 64, in particular a cloud-computer system 66. As a result, various participants can contribute to calculating to the global placement chart 62, thus partially shifting the computing and costs for this from the control system 10 in the motor vehicle to a computing center 64. This has the advantage that the motor vehicles 1, 80, 82, 84 can react more quickly to errors, and quickly return to functioning in compliance with a desire ASIL level after the problem has been solved.

The dynamic, context-based placement of software in a motor vehicle also has the advantage that an optimization of the power consumption is conceivable, by means of which the range of an electric motor vehicle 1 can be increased.

Figure 5:
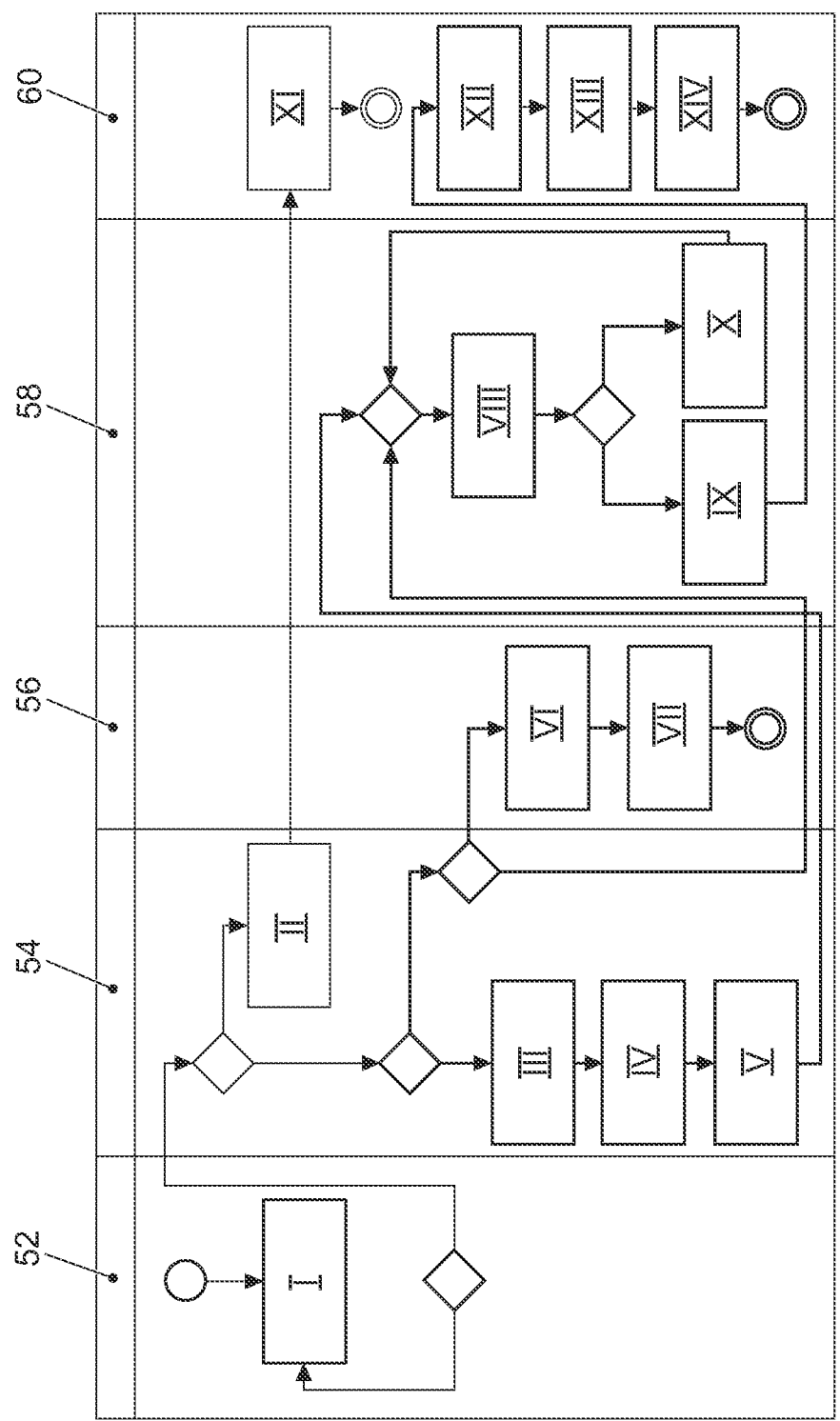
FIG. 5 shows a flow chart for monitoring the control system and a reconfiguration of the control system if a control unit malfunctions and/or there is an error in executing a program code under some aspects of the present disclosure.

A flow chart for monitoring the control system and a reconfiguration of the control system in the event of a malfunction of a control unit and/or an error in executing a program code is shown in FIG. 5. In step I, the execution of the program code 20, 22, 24, 26, 28, 30 on the control units 12, 14, 16, 18 in the control system 10 is monitored. If an error is detected, it is checked in step II whether there is a pre-calculated emergency plan, or whether such a plan must first be created. If an emergency plan is currently unavailable, containing a pre-calculated dynamic allocation of the executed program codes 20, 22, 24, 26, 28, 30 to the control units 12, 14, 16, 18, it is checked in a third step III whether enough redundant program executions are possible to ensure an operationally safe autonomous driving mode. If this prerequisite is satisfied, the relevant redundantly executed program codes are selected by a switching element 54 and executed on another control unit 12, 14, 16, 18 in a fourth step IV. This new configuration is selected as the new active program code 20, 22, 24, 26, 28, 30 in step V.

If not enough computing power is available for an operationally safe, autonomous driving mode of the motor vehicle 1 after a control unit 12, 14, 16, 18 malfunctions, an emergency operation module 56 is activated in step VI, which takes over the system control of the control system 10. The vehicle is then brought safely to a stop in step VII.

If enough redundancy is available, a reset module 58 is activated, which attempts to reset a software configuration to the highest possible target achievement level. Control units 12, 14, 16, 18 that have enough resources to also execute redundant program code 20, 22, 24, 26, 28, 30 are searched for in step VIII. If such a control unit is found, a new redundant program code 20, 22, 24, 26, 28, 30 is executed on a control unit 12, 14, 16, 18 in step IX. If there are not enough resources currently available on the control units 12, 14, 1, 18, program codes with lower priority are stopped in step X, in order to provide additional computing power for the safety-relevant program code.

If a pre-calculated emergency plan does exist in step II, this emergency plan is implemented by a placement optimizer 60 in step XI, and the computing center 64 is notified of this implementation via the communication interface 50. If there is no emergency plan, the goals of the implementation of an emergency plan are defined by a placement optimizer 60 in step XII, an optimization plan is then calculated in step XIII, and implemented in step XIV.

Figure 6:
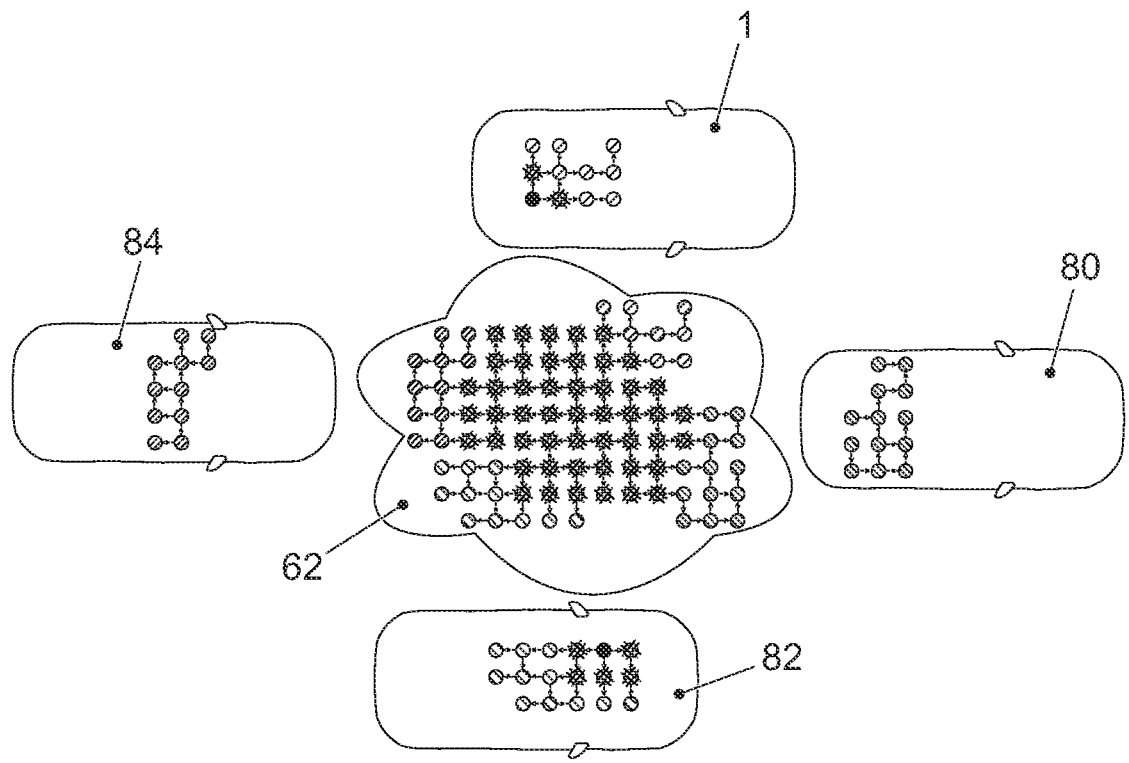
FIG. 6 shows a chart illustrating communication between various motor vehicles and a central computer, wherein the reconfigurations carried out in the motor vehicles are sent to the central computer and/or the central computer sends a best possible reconfiguration to the motor vehicle under some aspects of the present disclosure.

A data exchange between the global placement chart 62 calculated in the computing center 64 and various motor vehicles 1, 80, 82, 84 is shown in FIG. 6. A solution chart is calculated in the first motor vehicle 1. The second motor vehicle 80 downloads the global placement chart 62 and sends this global placement chart to the control system 10 in the second vehicle 80. Another solution chart is calculated in the third vehicle and sent to the computing center 64. Such a solution chart for a sub-problem is uploaded to the computing center 64 by the fourth motor vehicle 84.

Figure 7:
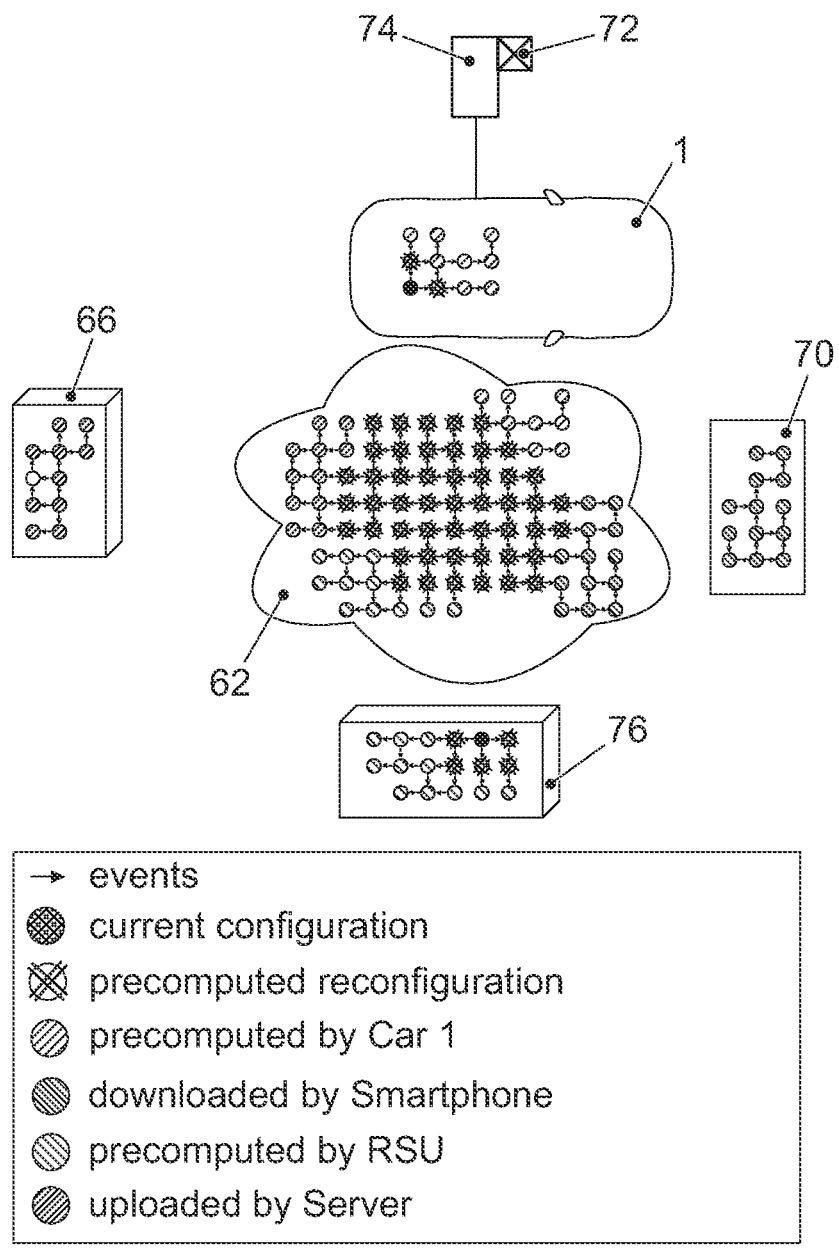
FIG. 7 shows a chart illustrating communication between a central computer and a motor vehicle, wherein the central computer exchanges additional information with other data sources under some aspects of the present disclosure.

The communication between the computing center 64 with the central placement chart 62, a vehicle, and other data sources 66, 70, 76, is shown in FIG. 7. Information provided by a cellular telephone 70, particularly preferably a smartphone, a cloud-computer system 66, or a server 68 can be taken into account as further data sources. The global placement chart 62 can also be improved further by road-site units 76. The determination of a solution of the central placement chart for the control system 10 in the motor vehicle preferably takes place during a charging process for an electrically powered motor vehicle 1 at a charging station 74. This procedure can be triggered by a control unit 72 in the charging station 74, or by the control system 10 in the motor vehicle 1. There is enough power and computing power in a charging process that an optimization chart can be sent to the control system 10 in the motor vehicle 1, and implemented there.

LIST OF REFERENCE SYMBOLS 1 motor vehicle
10 control system
12 first control unit
14 second control unit
16 third control unit
18 fourth control unit
20 first program code
22 second program code
24 third program code
26 fourth program code
28 fifth program code
30 sixth program code
32 first sensor
34 second sensor
36 third sensor
38 fourth sensor
40 fifth sensor
42 sixth sensor
44 navigator 46 internal memory
48 CPU
50 communication interface
52 monitoring element
54 switching element
56 emergency operation module
58 reset module
60 placement optimizer
62 global placement chart
64 computing center
66 cloud-computer system
68 server
70 cellular telephone
72 fifth control unit
74 charging station
76 road site unit
78 transmitter/receiver unit
80 second motor vehicle
82 third motor vehicle
84 fourth motor vehicle
100 computer program

The invention claimed is:

1. A method for dynamic, context-based distribution of program codes in a control system of a vehicle, wherein the control system comprises a plurality of control units, comprising:
   receiving, from an external computer, a global placement chart in the control system, wherein the global placement chart comprises a current configuration and one or more precomputed reconfigurations for preforming a vehicle function based on the plurality of control units of the control system;
   allocating program codes for fulfilling functions of an autonomous driving mode to corresponding control units in the control system via a current configuration of the global placement chart;
   monitoring, via a monitoring element, at least one of (i) the program codes and/or (ii) the control units to determine if at least one of the program codes and/or the control units have malfunctioned; and
   redistributing the program code to the control units in accordance with one or more precomputed reconfigurations of the global placement chart, if the monitoring determines that at least one of the program codes and/or the control units have malfunctioned.

2. The method according to claim 1, further comprising determining if the control system has an allocation plan for allocating remaining active program codes to available control units if the monitoring determines that at least one of the program codes and/or the control units have malfunctioned.

3. The method according to claim 2, further comprising allocating the remaining active program codes to the available control units via the allocation plan.

4. The method according to claim 2, further comprising determining whether a minimum number of necessary, redundantly-executed program codes are available for an autonomous driving mode if there is no allocation plan.

5. The method according to claim 4, further comprising one of (i) automatically bringing the vehicle to a standstill (ii) automatically navigating the vehicle to a stopping point via a fail-safe system, if a minimum number of redundantly executed program codes are available.

6. The method according to claim 5, further comprising operating the control system in an emergency mode, wherein an allocation plan is generated when enough necessary, redundant program codes are executed for an autonomous driving mode.

7. The method according to claim 1, further comprising determining which control units are unused or underutilized, and creating an allocation plan on the basis of which control units are available.

8. The method according to claim 7, wherein the program codes for fulfilling the functions of an autonomous driving mode are categorized in at least two orders of priority, wherein program codes of a lower order are stopped in order to provide additional computing power for executing higher order program codes.

9. The method according to claim 1, further comprising executing an optimization routine for optimizing program codes that are to be executed on remaining control units.

10. The method according to claim 1, wherein the global placement chart is determined based on information associated with different control systems in other motor vehicles.

11. A system for dynamic, context-based distribution of program codes in a vehicle, comprising
   a control system comprising a plurality of control units;
   communications for receiving a global placement chart from an external computer in the control system, wherein the global placement chart comprises a current configuration and one or more precomputed reconfigurations for preforming a vehicle function based on the plurality of control units of the control system;
   a monitoring element, for monitoring at least one of (i) the program codes and/or (ii) the control units to determine if at least one of the program codes and/or the control units have malfunctioned,
   wherein the control system is configured to allocate program codes for fulfilling functions of an autonomous driving mode to corresponding control units in the control system via the global placement chart using a current configuration of the global placement chart, and redistributing the program code to the control units in accordance with one or more precomputed reconfigurations of the global placement chart, if the monitoring determines that at least one of the program codes and/or the control units have malfunctioned.

12. The system according to claim 11, wherein the control system is configured to determine if the control system has an allocation plan for allocating remaining active program codes to available control units if the monitoring determines that at least one of the program codes and/or the control units have malfunctioned.

13. The system according to claim 12, wherein the control system is configured to allocate the remaining active program codes to the available control units via the allocation plan.

14. The system according to claim 12, wherein the control system is configured to determine whether a minimum number of necessary, redundantly-executed program codes are available for an autonomous driving mode if there is no allocation plan.

15. The system according to claim 14, wherein the control system is configured to one of (i) automatically bring the vehicle to a standstill (ii) automatically navigate the vehicle to a stopping point via a fail-safe system, if a minimum number of redundantly executed program codes are available.

16. The system according to claim 15, wherein the control system is configured to operate in an emergency mode, wherein an allocation plan is generated when enough necessary, redundant program codes are executed for an autonomous driving mode.

17. The system according to claim 11, wherein the control system is configured to determine which control units are unused or underutilized, and creating an allocation plan on the basis of which control units are available.

18. The system according to claim 17, wherein the control system is configured to categorize program codes for fulfilling the functions of an autonomous driving mode in at least two orders of priority, wherein program codes of a lower order are stopped in order to provide additional computing power for executing higher order program codes.

19. The system according to claim 11, wherein the control system is configured to execute an optimization routine for optimizing program codes that are to be executed on remaining control units.

20. The system according to claim 11, wherein the global placement chart is determined based on information associated with different control systems in other motor vehicles.

* * * * *